(12) United States Patent
Takano et al.

(10) Patent No.: US 10,619,031 B2
(45) Date of Patent: Apr. 14, 2020

(54) CRYSTALLIZABLE THERMOPLASTIC RESIN COMPOSITION AND MOLDED ARTICLE

(71) Applicant: MITSUBISHI ENGINEERING-PLASTICS CORPORATION, Tokyo (JP)

(72) Inventors: Takahiro Takano, Kanagawa (JP); Ryusuke Yamada, Kanagawa (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 0 days.

(21) Appl. No.: 14/899,230

(22) PCT Filed: Jun. 13, 2014

(86) PCT No.: PCT/JP2014/065700
§ 371 (c)(1),
(2) Date: Dec. 17, 2015

(87) PCT Pub. No.: WO2014/203811
PCT Pub. Date: Dec. 24, 2014

(65) Prior Publication Data
US 2016/0145419 A1   May 26, 2016

(30) Foreign Application Priority Data

Jun. 21, 2013  (JP) ................. 2013-130211

(51) Int. Cl.
| | |
|---|---|
| C08K 7/06 | (2006.01) |
| C08K 3/04 | (2006.01) |
| C08K 3/34 | (2006.01) |
| C08L 77/06 | (2006.01) |
| C08G 69/26 | (2006.01) |
| C08J 5/04 | (2006.01) |
| C08K 7/04 | (2006.01) |
| C08K 5/098 | (2006.01) |

(52) U.S. Cl.
CPC .............. *C08K 7/06* (2013.01); *C08G 69/265* (2013.01); *C08J 5/042* (2013.01); *C08K 3/04* (2013.01); *C08K 3/34* (2013.01); *C08K 5/098* (2013.01); *C08K 7/04* (2013.01); *C08L 77/06* (2013.01); *C08J 2377/00* (2013.01)

(58) Field of Classification Search
USPC ........................................ 524/495, 496, 602
See application file for complete search history.

(56) References Cited

U.S. PATENT DOCUMENTS

| | | | | |
|---|---|---|---|---|
| 5,470,909 A | * | 11/1995 | Nishii ................... | C08L 71/126 524/449 |
| 5,750,616 A | | 5/1998 | Shimpuku et al. | |
| 5,958,303 A | * | 9/1999 | Narkis ................... | C08F 283/00 252/511 |
| 6,221,547 B1 | * | 4/2001 | Iizuka ..................... | C08K 3/04 252/511 |
| 6,887,930 B2 | * | 5/2005 | Uchida ................... | C08L 77/00 524/430 |
| 2006/0099505 A1 | * | 5/2006 | Fujino .................... | H01M 4/04 429/217 |
| 2007/0240295 A1 | * | 10/2007 | Yamada ................ | B24B 21/006 29/90.5 |
| 2009/0004453 A1 | * | 1/2009 | Murai .................. | B29C 43/003 428/299.1 |
| 2009/0130313 A1 | * | 5/2009 | Ohshima .............. | B41M 5/0023 427/288 |
| 2011/0124789 A1 | * | 5/2011 | Choi ......................... | C08J 3/12 524/420 |
| 2011/0287243 A1 | * | 11/2011 | Carney .................. | B32B 27/20 428/220 |
| 2012/0177937 A1 | * | 7/2012 | Ogawa .................. | C08G 69/26 428/458 |
| 2012/0183711 A1 | * | 7/2012 | Brule ...................... | C08L 77/06 428/36.91 |

(Continued)

FOREIGN PATENT DOCUMENTS

| | | |
|---|---|---|
| CN | 101107322 A | 1/2008 |
| GB | 1467495 * | 3/1977 |

(Continued)

OTHER PUBLICATIONS

International Preliminary Report on Patentability and Written Opinion of the International Searching Authority (forms PCT/IB/373, PCT/ISA/237, PCT/IB/326, and PCT/IB/338), dated Dec. 30, 2015, for International Application No. PCT/JP2014/065700, with an English translation of the Written Opinion.
International Search Report (PCT/ISA/210), dated Sep. 16, 2014, for International Application No. PCT/JP2014/065700.
Chinese Office Action and Search Report dated Nov. 30, 2016, for corresponding Chinese Application No. 201480035111.4, including an English translation of the Chinese Office Action.
Extended European Search Report dated Jan. 25, 2017, for corresponding European Application No. 14814088.2.

(Continued)

*Primary Examiner* — Tae H Yoon
(74) *Attorney, Agent, or Firm* — Birch, Stewart, Kolasch & Birch, LLP

(57) ABSTRACT

Provided is resin molded articles having large elastic modulus, and good appearance. A thermoplastic resin composition contains 80 to 120 parts by weight of a carbon fiber and 0.1 to 3.0 parts by weight of a black colorant, per 100 parts by weight of a (A) crystallizable thermoplastic resin which shows a semicrystallization time (ST (P)) of 20 to 500 seconds, wherein the semicrystallization time is measured by depolarization photometry, under conditions that a sample melting temperature is 20 to 40° C. higher than a melting point of the crystallizable thermoplastic resin, a sample melting time is 3 minutes, and an oil bath temperature for crystallization is 140° C.

8 Claims, No Drawings

(56) References Cited

U.S. PATENT DOCUMENTS

| | | | |
|---|---|---|---|
| 2012/0235092 A1* | 9/2012 | Sekimura | C08L 67/00 |
| | | | 252/299.64 |
| 2013/0011645 A1* | 1/2013 | Carney | B32B 27/08 |
| | | | 428/220 |
| 2013/0165576 A1* | 6/2013 | Shin | C08K 3/04 |
| | | | 524/495 |
| 2013/0177765 A1* | 7/2013 | Lim | H05K 9/009 |
| | | | 428/407 |
| 2013/0197145 A1* | 8/2013 | Thompson | C08K 5/098 |
| | | | 524/397 |
| 2014/0288229 A1 | 9/2014 | Sotokawa et al. | |

FOREIGN PATENT DOCUMENTS

| | | | |
|---|---|---|---|
| JP | 8-259809 A | | 10/1996 |
| JP | 8-269228 A | | 10/1996 |
| JP | 11-309738 A | | 11/1999 |
| JP | 2001-040229 | * | 2/2001 |
| JP | 2001-40229 A | | 2/2001 |
| JP | 2001-81318 A | | 3/2001 |
| JP | 2003-231807 A | | 8/2003 |
| JP | 2006-263828 A | | 9/2005 |
| JP | 2010-538104 A | | 12/2010 |
| JP | 2012-255063 A | | 12/2012 |
| JP | 2013-159675 A | | 8/2013 |
| WO | WO 2013/077238 A1 | | 5/2013 |

OTHER PUBLICATIONS

Chinese Office Action for corresponding Chinese Application No. 201480035111.4, dated Jul. 4, 2017, with an English translation.
Japanese Office Action issued in corresponding Japanese Application No. 2015-522876 and dated Jul. 3, 2018.

* cited by examiner

CRYSTALLIZABLE THERMOPLASTIC RESIN COMPOSITION AND MOLDED ARTICLE

This application is the U.S. National Phase of PCT/JP2014/065700, filed Jun. 13, 2014, and which claims priority to Application No. 2013-130211 filed in Japan on Jun. 21, 2013, the entire contents of all of which are expressly incorporated by reference into the present application.

TECHNICAL FIELD

This invention relates to a crystallizable thermoplastic resin composition, and a molded article obtained by molding the crystallizable thermoplastic resin composition.

BACKGROUND ART

With recent increasing level of demand for advanced performance, plastics have been required to serve as a metal substitutes. For example, Patent Literature 1 discloses a resin composition capable of yielding a molded article having high levels of rigidity and elastic modulus, as a result of blending of a polyamide resin with a carbon fiber having a predetermined strength. Patent Literature 1 also describes that blending of a granular filler successfully reduced the surface roughness and waviness.

Patent Literature 2 describes a colored filament-reinforced pellet which contains a thermoplastic polymer resin, a fiber reinforcement having a length of approximately 5 mm or longer and 50 mm or shorter, and a pigment, wherein the addition quantity of the pigment is approximately 0.01% by weight or more and 5% by weight or less.

Patent Literature 3 discloses a thermoplastic resin composition configured by 100 parts by weight of a resin component which is composed of 40 to 98% by weight of a thermoplastic resin (A), and 60 to 2% by weight of a thermoplastic resin (B) having a softening point 17° C. or more lower than that of the thermoplastic resin (A), blended with 1 to 25 parts by weight of a carbon black (C), and 10 to 190 parts by weight of a fibrous filler (D).

Patent Literature 4 discloses a fiber-reinforced thermoplastic composite "A" configured by a thermoplastic resin, and a fiber reinforcement and a carbon black which are highly dispersed therein, the fiber reinforcement having an average diameter of 3 to 21 µm and an average length of 0.3 to 30 mm, the content of which being 5 to 80% by weight relative to the composite, the carbon black having a structure length in primary aggregate of 60 nm or shorter, and the content of which being 0.01 to 5% by weight relative to the composite.

Patent Literature 5 discloses a carbon filament-reinforced polyamide resin prepreg containing a polyamide resin and a carbon fiber, and the content of the carbon fiber being 40 to 80% by mass.

CITATION LIST

Patent Literature

[Patent Literature 1] JP-A-2012-255063
[Patent Literature 2] JP-T2-2010-538104
[Patent Literature 3] JP-A-H11-309738
[Patent Literature 4] JP-A-H08-269228
[Patent Literature 5] JP-A-2013-159675

SUMMARY OF THE INVENTION

Technical Problem

Addition of a large amount of carbon fiber, described above, would be a possible way to enhance the rigidity and to concurrently increase the elastic modulus. Such addition of a large amount of carbon fiber may, however, give a notable floating of carbon fiber on the surface of a resultant resin molded article, or may make the carbon fiber visible through the resin molded article, raising problems of poor appearance due to factors other than the surface roughness and waviness.

It is therefore an object of this invention to solve these problems, and to provide a crystallizable thermoplastic resin composition which is capable of yielding a molded article characterized by high rigidity, large elastic modulus, and good appearance without notable floating of carbon fiber and visible carbon fiber seen through it.

Solution to Problem

Now, a possible method to suppress the floating of carbon fiber would be use of a slowly-crystallizing resin as the base resin. The slowly-crystallizing resin, when used in the process of molding, can crystallize slowly in dies, so that a resultant resin molded article will have the surface over which the floating of carbon fiber is suppressed. In addition, mixing of the black colorant also successfully solves the problem that the carbon fiber is visible through the resin molded article. A large addition quantity of black colorant, however, results in the floating of carbon fiber. Based on these findings, the present inventors found that it becomes possible to provide a resin composition capable of yielding a resin molded article characterized by high levels of rigidity, elastic modulus and good appearance, by incorporating specific amounts of carbon fiber and black colorant into a specific thermoplastic resin, and preferably according to <2> to <11>, and completed this invention.

<1> A thermoplastic resin composition comprising 80 to 120 parts by weight of a carbon fiber and 0.1 to 3.0 parts by weight of a black colorant, per 100 parts by weight of a (A) crystallizable thermoplastic resin which shows a semicrystallization time (ST (P)) of 20 to 500 seconds, wherein the semicrystallization time is measured by depolarization photometry, under conditions that a sample melting temperature is 20 to 40° C. higher than a melting point of the crystallizable thermoplastic resin, a sample melting time is 3 minutes, and an oil bath temperature for crystallization is 140° C.

<2> The thermoplastic resin composition of <1>, wherein the (A) crystallizable thermoplastic resin is a polyamide resin.

<3> The thermoplastic resin composition of <2>, wherein the polyamide resin contains an aromatic ring in a molecule thereof, and has a ratio of carbon atoms composing the aromatic ring, relative to the polyamide resin molecule, of 30% by mol or larger.

<4> The thermoplastic resin composition of any one of <1> to <3>, wherein the black colorant is carbon black.

<5> The thermoplastic resin composition of any one of <1> to <4>, containing at least a polyacrylonitrile-based carbon fiber (PAN-based fiber) as the carbon fiber.

<6> The thermoplastic resin composition of any one of <1> to <4>, wherein 30% by weight or more of the the carbon fiber, contained in the thermoplastic resin composition, is assignable to a polyacrylonitrile-based carbon fiber (PAN-based fiber).

<7> The thermoplastic resin composition of any one of <1> to <6>, wherein the addition quantity of talc, contained in the thermoplastic resin composition, is 1% by weight or less relative to the thermoplastic resin composition.

<8> The thermoplastic resin composition of any one of <1> to <7>, wherein the carbon fiber shows a tensile strength of 5.0 GPa or smaller, when measured at 23° C. in accordance with JIS R7601.

<9> A thermoplastic resin composition comprising 80 to 120 parts by weight of a carbon fiber and 0.1 to 3.0 parts by weight of carbon black, per 100 parts by weight of a xylylenediamine-based polyamide resin in which 70% by mol or more of the diamine constitutive unit being derived from metaxylylenediamine and/or paraxylylenediamine, and 70% by mol or more of the dicarboxylic acid constitutive unit (constitutive unit derived from dicarboxylic acid) being derived from an α,Ω-straight-chain aliphatic dicarboxylic acid having 4 to 20 carbon atoms.

<10> The thermoplastic resin composition of <9>, wherein the α,Ω-straight-chain aliphatic dicarboxylic acid having 4 to 20 carbon atoms is adipic acid and/or sebacic acid.

<11> A molded article obtained by molding the thermoplastic resin composition described in any one of <1> to <10>.

Advantageous Effects of Invention

This invention is the first to provide a crystallizable thermoplastic resin composition which is capable of yielding a molded article characterized by high rigidity, large elastic modulus, and good appearance without notable floating of carbon fiber and without visible carbon fiber seen therethrough.

DESCRIPTION OF EMBODIMENTS

This invention will be detailed below. Note that, in this specification, all numerical ranges given in the form of "to" preceded and succeeded by numerals are defined to contain these numerals as the lower and upper limit values.

<Crystallizable Thermoplastic Resin>

The composition of this invention uses a (A) crystallizable thermoplastic resin which shows a semicrystallization time (ST(P)) of 20 to 500 seconds. The semicrystallization time is measured by depolarization photometry, under conditions that a sample melting temperature is 20 to 40° C. higher than the melting point of the crystallizable thermoplastic resin, a sample melting time is 3 minutes, and an oil bath temperature for crystallization is 140° C. Depolarization may be measured, for example, by using a polymer crystallization rate measuring apparatus (Model MK701, from Kotaki Seisakusho, Ltd.).

In this invention, the (A) thermoplastic resin is crystallizable, and, preferably shows a semicrystallization time (ST(P)), measured by depolarization photometry in the process of crystallization at 160° C., of 20 to 450 seconds, and more preferably 25 to 150 seconds.

By determining the semicrystallization time to 20 seconds or longer, the surface of the molded article may now be conditioned uniformly. Meanwhile, by determining the semicrystallization time to 500 seconds or shorter, solidification failure or mold releasing failure in injection molding may now be suppressed. Owing to thorough proceeding of crystallization, the resultant molded article will have a small temperature-dependence of water absorption or other physical properties, and will have a good dimensional stability.

The crystallizable thermoplastic resin is exemplified by polyolefin resin, polyester resin, polyacetal resin, polyphenylene sulfide resin, polyamide resin, and liquid crystal polymer, and among which polyamide resin is preferable.

As for the polyester resin, the description in paragraphs [0013] to [0016] of JP-A-2010-174223 may be referred.

As for the polyacetal resin, the descriptions in paragraph [0011] of JP-A-2003-003041, and paragraphs [0018] to [0020] of JP-A-2003-220667 may be referred.

As for the polyamide resin, the descriptions in paragraphs [0017] to [0029] of JP-A-2012-35504, paragraphs [0009] to [0032] of Japanese Patent Application No. 4961645, and paragraphs [0017] to [0032] of JP-A-2012-201412 may be referred.

In this invention, the polyamide resin preferably contains an aromatic ring in the molecule thereof, and the ratio of carbon atom composing the aromatic ring, relative to the polyamide resin molecule, is 30% by mol or larger. By using this sort of resin, the water absorption will be reduced, and the dimensional change upon water absorption may consequently be suppressed in a more effective manner. The polyamide resin is preferably a xylylenediamine-based polyamide resin in which 50% by mol or more of diamine is derived from xylylenediamine, and is polycondensed with a dicarboxylic acid.

More preferably, it is a xylylenediamine-based polyamide resin, in which 70% by mol or more, and more preferably 80% by mol or more, of the diamine constitutive unit is derived from metaxylylenediamine and/or paraxylylenediamine; and 50% by mol or more, preferably 70% by mol or more, and particularly 80% by mol or more of the dicarboxylic acid constitutive unit (constitutive unit derived from dicarboxylic acid) is derived from an α,Ω-straight-chain aliphatic dicarboxylic acid preferably having 4 to 20 carbon atoms. The α,Ω-straight-chain aliphatic dicarboxylic acid having 4 to 20 carbon atoms is suitably selectable from adipic acid, sebacic acid, suberic acid, dodecanedioic acid, and eicosadienoic acid, among which adipic acid and/or sebacic acid are more preferable, and adipic acid is even more preferable.

The crystallizable thermoplastic resin used in this invention preferably has a glass transition point of 40 to 180° C., and more preferably 60 to 130° C. The crystallizable thermoplastic resin used in this invention preferably has a melting point of 150 to 350° C., and more preferably 200 to 330° C. For the crystallizable thermoplastic resin having two or more melting peaks, the melting point will be determined based on the the lowest melting peak.

The crystallizable thermoplastic resin used in this invention preferably has a number-average molecular weight of 5000 to 45000, and more preferably 10000 to 25000.

The addition quantity of the crystallizable thermoplastic resin in the composition of this invention is preferably 30% by weight or above, and more preferably 40% by weight or above. The upper limit is preferably 60% by weight or below. Only a single species of the crystallizable thermoplastic resin may be used, or two or more species may be used in combination. When two or more species are used in combination, the total addition quantity preferably falls within the above-described ranges. In a particularly preferable embodiment of this invention, the addition quantity of the polyamide resin in the composition of this invention is preferably 30% by weight or above, and more preferably 40% by weight or above.

<Carbon Fiber>

The composition of this invention contains a carbon fiber. Species and other features of the carbon fiber used in this invention are not specifically limited, and both of polyacrylonitrile-based carbon fiber (PAN-based fiber) and pitch-based carbon fiber using pitch may be used, wherein the polyacrylonitrile-based carbon fiber (PAN-based fiber) is preferable. A preferable embodiment of this invention is exemplified by a composition in which the polyacrylonitrile-based carbon fiber (PAN-based fiber) accounts for 30% by weight or more of the carbon fiber contained in the thermoplastic resin composition, and a more preferable embodiment is exemplified by a composition in which 90% by weight or more of the carbon fiber contained in the thermoplastic resin composition is a polyacrylonitrile-based carbon fiber (PAN-based fiber). With such configuration, there will be tendencies of further improvement in the elastic modulus and Charpy impact strength.

The carbon fiber used this invention may be either roving or chopped strand. The carbon fiber used in this invention preferably has a weight-average fiber length of 0.1 to 25 mm. In particular, the carbon fiber in the kneaded resin composition preferably has a weight-average fiber length of 80 to 500 µm, and more preferably 100 to 350 µm.

The carbon fiber used in this invention preferably has an average fiber diameter of 3 to 20 µm, and more preferably 5 to 15 µm.

The carbon fiber used in this invention may also have a tensile strength, when measured at 23° C. in accordance with JIS R7601, of 5.0 GPa or smaller (preferably 3.5 to 5.0 GPa, and more preferably 3.5 to 4.9 GPa). This sort of carbon fiber is easily available and is therefore preferable. The composition of this invention can keep good levels of elastic modulus and Charpy impact strength, even if the carbon fiber having such small tensile strength is used, and can give a good appearance.

The addition quantity of the carbon fiber in the composition of this invention is 80 to 120 parts by weight per 100 parts by weight of the crystallizable thermoplastic resin, preferably 80 to 110 parts by weight, more preferably 80 to 105 parts by weight, and even more preferably 80 to 100 parts by weight. If the addition quantity is excessive, clogging tends to occur in dies or other apparatuses, and this makes it difficult to manufacture or compound the resin composition having the individual components dispersed therein. Meanwhile, if the addition quantity is too small, effects of improving the rigidity and elastic modulus tend to be insufficient. Only a single species of the carbon fiber may be used, or two or more species may be used in combination. When two or more species are used in combination, the total addition quantity preferably falls within the above-described ranges.

In the composition of this invention, the total content of the crystallizable thermoplastic resin and the carbon fiber preferably accounts for 90% by weight or more of the composition of this invention.

<Black Colorant>

The composition of this invention contains a black colorant. As a result of addition of 0.1 to 3.0 parts by weight of black colorant per 100 parts by weight of the crystallizable thermoplastic resin, this invention can provide a crystallizable thermoplastic resin composition capable of yielding a molded article characterized by high rigidity, large elastic modulus, and good appearance without notable floating of carbon fiber and without visible carbon fiber seen therethrough.

While species of the black colorant is not specifically limited, at least one species selected from the group consisting of pigments such as carbon black and titanium black, and dyes such as nigrosine and aniline black is preferably contained. Carbon black is more preferable.

According to the composition of this invention, the carbon black added thereto can act as a nucleating agent, so that a good formability is achieved in the process of thin wall molding. In more detail, while the composition of this invention cannot cure so swiftly in the process of thin wall molding due to the slow-curing resin used therein, the carbon black added as the black colorant can act a nucleating agent to accelerate the curing. As a consequence, in this invention, even a thin wall molded article having a portion of 1 mm or less in thickness may suitably be molded. Accordingly, this invention may also be embodied substantially without containing any other nucleating agent. The phrase of "substantially without containing" in this context may be exemplified by the case where the content is 5% by weight or less relative to the addition quantity of the black colorant.

As the carbon black, any of conventionally known carbon blacks may freely be used in this invention. They are exemplified by furnace black, channel black, Ketjen black and acetylene black. Among them, it is preferable to use a carbon black featured by its good concealability, and showing a DBP absorption of 30 to 300 $cm^3$/100 g, particularly furnace black, in view of developing a stable hue.

As the nigrosine, any of conventionally known products may freely be used in this invention, which are exemplified by black azine-based condensed mixtures listed in the Color Index under the names of C.I. Solvent Black 5 and C.I. Solvent Black 7. Commercial products include Nubian Black (trade name) from Orient Chemical Industries Co., Ltd.

While methods of manufacturing the nigrosine used in this invention are not specifically limited, a typical method is such as subjecting aniline, aniline hydrochloride and nitrobenzene to oxidation and dehydrating condensation in the presence of iron chloride at a reaction temperature of 160 to 180° C. The nigrosine is obtained as a mixture of a variety of different compounds depending on reaction conditions, source materials to be fed, and feed ratio, and is a mixture of a variety of azine-based compounds such as triphenazine oxazine, phenazine azine and so forth.

As aniline black used in this invention, exemplified is an oxidative condensation mixture of black aniline derivatives and so forth, typically listed in the Color Index under the name of C.I. Pigment Black 1, which is given as a mixture of several kinds of intermediates and byproducts, depending on reaction conditions of the oxidative condensation. More specifically, it is obtained in the form of black colorant mixture, by subjecting aniline hydrochloride and aniline to oxidative condensation at a reaction temperature of 40 to 60° C. for 1 to 2 days, and then immersing the product into a sulfuric acid-acidified dichromate solution for a short time for complete oxidative condensation. The aniline black is typically exemplified by aniline black from ICI.

The addition quantity of the black colorant in the composition of this invention is 0.1 parts by weight or more, per 100 parts by weight of crystallizable thermoplastic resin, preferably 0.3 parts by weight or more, even more preferably 0.4 parts by weight or more, and yet more preferably 0.6 parts by weight or more. The upper limit is less than 3.0 parts by weight or below, per 100 parts by weight of the crystallizable thermoplastic resin, preferably less than 3.0 parts by weight, more preferably 2.9 parts by weight or below, even more preferably 2.5 parts by weight or below, yet more preferably 2.0 parts by weight or below, and furthermore preferably 1.5 parts by weight. Only a single species of the black colorant may be used, or two or more species may be used in combination. When two or more species are used in combination, the total addition quantity preferably falls within the above-described ranges.

<Mold Releasing Agent>

The composition of this invention is preferably mixed with a mold releasing agent, aiming at improving mold releasability in the process of molding. As the mold releasing agent, those less likely to degrade the flame retardancy of the composition of this invention are preferable, which are exemplified by carboxylic acid amide-based wax, bis-amide-based wax, and metal salt of long-chain fatty acid.

The carboxylic acid amide-based wax is obtained by dehydration reaction of a mixture of a higher aliphatic monocarboxylic acid and a polybasic acid, with a diamine compound. The higher aliphatic monocarboxylic acid is preferably saturated aliphatic monocarboxylic acid or hydroxycarboxylic acid, having 16 or more carbon atoms, which are exemplified by palmitic acid, stearic acid, behenic acid, montanic acid, and 12-hydroxystearic acid. The polybasic acid is di- or higher-basic carboxylic acid, and is exemplified by aliphatic dicarboxylic acid such as malonic acid, succinic acid, adipic acid, sebacic acid, pimelic acid and azelaic acid; aromatic dicarboxylic acid such as phthalic acid and terephthalic acid; and alicyclic dicarboxylic acid such as cyclohexane dicarboxylic acid and cyclohexylsuccinic acid.

The diamine compound is exemplified by ethylenediamine, 1,3-diaminopropane, 1,4-diaminobutane, hexamethylenediamine, metaxylylenediamine, tolylenediamine, paraxylylenediamine, phenylenediamine, and isophoronediamine.

The carboxylic acid amide-based wax in this invention may have an arbitrarily controlled softening point, based on the mixing ratio of the polybasic acid, relative to the higher aliphatic monocarboxylic acid used for the manufacture. The mixing ratio of polybasic acid is preferably in the range from 0.18 to 1 mole, relative to 2 moles of the higher aliphatic monocarboxylic acid. The amount of consumption of the diamine compound is preferably in the range from 1.5 to 2 moles, relative to 2 moles of the higher aliphatic monocarboxylic acid, which is variable depending on the amount of polybasic acid to be used.

The bisamide-based wax is exemplified by reaction product formed by a diamine compound such as N,N'-methylenebisstearic acid amide or N,N'-ethylenebisstearic acid amide, and a fatty acid; and, dioctadecyl dibasic acid amide such as N,N'-dioctadecylterephthalic acid amide.

The metal salt of long-chain fatty acid is metal salt of long-chain fatty acid having 16 to 36 carbon atoms, and is exemplified by calcium stearate, calcium montanate, sodium montanate, zinc stearate, aluminum stearate, sodium stearate and lithium stearate.

The addition quantity of the mold releasing agent, when added to the composition of this invention, is preferably 0.1 to 3.0 parts by weight per 100 parts by weight of the crystallizable thermoplastic resin, and more preferably 0.1 to 2.0 parts by weight.

Only a single species of the mold releasing agent may be used, or two or more species may be used in combination. When two or more species are used in combination, the total addition quantity preferably falls within the above-described ranges.

<Other Additives>

The thermoplastic resin composition of this invention may optionally contain any of other additives, which are exemplified by heat stabilizer, antioxidant, UV absorber, dye or pigment other than the black colorant, flame retarder, anti-dripping agent, antistatic agent, anti-clouding agent, anti-blocking agent, fluidity modifier, plasticizer, dispersion aid, and antibacterial agent. The content of these components is preferably 5% by weight or less relative to the composition of this invention. The thermoplastic resin composition of this invention may be configured to contain substantially no dye or pigment other than the black colorant. The phrase of "to contain substantially no (dye or pigment)" in this context means that the content is 1% by weight or less of the addition quantity of the carbon black contained in the thermoplastic resin composition of this invention.

The composition of this invention preferably contains 1% by weight or less, relative to the composition of this invention, of talc, and more preferably contains substantially no talc. With such configuration, the crystallization rate may be suppressed from increasing, the carbon fiber will be less likely to expose on the surface, and thereby an excellent appearance may be achieved. Now the phrase of "contains substantially no (talc)" in this context may be exemplified by the case where the content is 5% by weight or less relative to the addition quantity of the black colorant.

While the composition of this invention may contain a filler other than the carbon fiber, it may also be configured to contain substantially no filler other than the carbon fiber. Now the phrase of "to contain substantially no (filler other than the carbon fiber)" may be exemplified the case where the content is 5% by weight or less relative to the addition quantity of the carbon fiber.

<Method of Manufacturing Composition>

Method of manufacturing the composition of this invention is widely selectable from known methods of manufacturing a thermoplastic resin composition without special limitation. More specifically, the crystallizable thermoplastic resin, the carbon fiber, the black colorant, and other components to be added optionally are preliminarily mixed typically by using any of various types of mixers such as tumbler or Henschel mixer, and then further be melt-kneaded using a mixer such as Bunbury mixer, roll mixer, Brabender mixer, single-screw kneader extruder, twin-screw kneader extruder, or kneader.

Alternatively, the components may be fed using a feeder to an extruder, without preliminary mixing, or, after preliminary mixing of only a part of the components, and then fed through a feeder to an extruder for melt-kneading, to thereby manufacture the composition of this invention.

Still alternatively, a composition obtained by feeding a part of the components having been preliminarily mixed into an extruder and melt-kneaded to prepare a master batch, mixing the master batch again with the residual components, and then melt-kneading the mixture to manufacture the composition of this invention.

Note that, for an exemplary case where a less-dispersible component is mixed, the dispersibility may be improved by preliminarily dissolving or dispersing such less-dispersible component in a solvent such as water or organic solvent, followed by kneading with the resultant solution or dispersion liquid.

<Molded Article>

The composition of this invention is often molded into an arbitrary shape, and used in the form of molded article. Shape, pattern, color and dimension of the molded article may freely be determined without special limitation, depending on applications of the molded article. Thin wall molded article is exemplified as a molded article which can enjoy special effects including high rigidity, large elastic modulus, and good appearance with suppressed floating of the carbon fiber and invisibility of the carbon fiber. The thickness of a thin portion of the molded article yielded from the composition of this invention may be 0.2 to 4 mm, and it is even possible to produce a molded article having a portion of 0.5 to 2 mm thick.

The molded article obtained from the composition of this invention is excellent in rigidity and strength. ISO test pieces typically manufactured in Examples below can show a flexural modulus of 30 GPa or larger, and particularly 35 to 50 GPa, when measured at 23° C. in accordance with ISO 178.

Applications of the molded article are exemplified by electronic/electric equipment, OA equipment, information terminal devices, mechanical parts, home appliances, vehicle parts, building components, various containers, goods for leisure-time amusement and miscellaneous goods, and lighting equipment.

Methods of manufacturing the molded article are freely selectable, without special limitation, from methods of molding having been widely employed for molding thermoplastic resin composition. The methods are exemplified by injection molding, ultrahigh-speed injection molding, injection compression molding, two-color molding, hollow molding such as gas-assist molding, molding using a heat insulating mold, molding using a rapid heating mold, foaming (including supercritical fluid), insert molding, IMC (in-mold coating) molding, extrusion molding, sheet forming, thermoforming, rotational molding, lamination forming, and press forming. Also a molding method based on a hot-runner system is adoptable. Since a specific crystallizable thermoplastic composition is used in this invention, so that the temperature of the mold, when used for molding, is preferably set to 100° C. or above, and particularly 120° C. or above. If the mold temperature is too low, the thermoplastic resin will only poorly crystallize, so that the appearance tends to show a poorly transferred mold pattern and floating of the filler. The upper limit of the mold temperature is preferably 180° C. or below, from the viewpoint of suppressing deformation of the molded article when ejected from the mold. The upper limit may typically be set to, but not specifically limited to, 160° C. or below.

EXAMPLE

This invention will be explained in further detail, referring to Examples. Materials, amounts of consumption, ratios, details of processes, and procedures of processes are suitably modified without departing from the spirit of this invention. The scope of this invention is, therefore, not limited to the specific Examples descried below.

Materials Used for Examples

PAMXD6: polymetaxylylene azipamide, under the trade name of "MX Nylon 56000" from Mitsubishi Gas Chemical Corporation, melting point=243° C., glass transition point=75° C.

The semicrystallization time (ST(P)) was found to be 100 seconds, when measured by depolarization photometry, under conditions that a sample melting temperature is 20 to 40° C. higher than the melting point of the crystallizable thermoplastic resin, a sample melting time is 3 minutes, and an oil bath temperature for crystallization is 140° C., using a polymer crystallization rate measuring apparatus (Model MK701, from Kotaki Seisakusho, Ltd.).

PAMP6: Synthesized according to the exemplary manufacture described below.

Synthesis of Polyamide (PAMP6)

Adipic acid was melted under heating in a reaction can with a nitrogen atmosphere, the content was kept under stirring, and heated up to 270° C. while slowing dropping therein a 3:7 (by mole) mixed diamine of paraxylylenediamine (from Mitsubishi Gas Chemical Company) and metaxylylenediamine (from Mitsubishi Gas Chemical Company) under pressure (0.35 MPa), so as to control the molar ratio of the amines and adipic acid (from Rhodia) to approximately 1:1. After completion of the dropping, the pressure was reduced to 0.06 MPa, the reaction was allowed to proceed for 10 minutes, so as to control the amount of components having molecular weights of 1,000 or smaller. The content was then taken out in the form of strands, pelletized using a pelletizer, to obtain polyamide which is referred to as "PAMP6", hereinafter.

The melting point was found to be 257° C., and the glass transition point was found to be 75° C. The semicrystallization time (ST(P)) measured in the same way as described above was found to be 30 seconds.

PA66: Polyamide 66, Zytel 101NC-10 from DuPont, melting point=265° C., glass transition point=55° C.

The semicrystallization time (ST(P)) measured in the same way as described above was found to be 3 seconds.

CF (PAN-based): polyacrylonitrile-based carbon fiber, Pyrofil TR06NL from Mitsubishi Rayon Co., Ltd., tensile strength=4.9 GPa, average fiber diameter=7 μm, average fiber length=6 mm (weight-average fiber length in resin composition=160 μm)

CF (pitch-based): pitch-based carbon fiber, Dialead K223SE from Mitsubishi Plastics, Inc., tensile strength=2.6 GPa, average fiber diameter=11 μm, average fiber length 6 mm (weight-average fiber length in resin composition=170 μm)

Glass fiber: 03T-296GH from Nippon Electric Glass Co., Ltd., average fiber diameter=10 μm, average fiber length=3 mm (weight-average fiber length in resin composition=150 μm)

Carbon black: Carbon Black #45 from Mitsubishi Chemical Corporation, (furnace black, DBP absorption=53 cm$^3$/100 g)

Black dye: Nubian Black EP-3 from Orient Chemical Industries, Co., Ltd.

Mold releasing agent: calcium montanate, CS-8CP from Nitto Chemical Industry Co., Ltd.

<Manufacture of ISO Test Piece>

The individual components were dry-blended according to the ratio listed in Table below, and the obtained dry blend was then fed to the base portion of a twin-screw extruder ("TEM26SS" from Toshiba Machine Co., Ltd.) to manufacture pellets. The temperature of extruder was set to 280° C., and the discharge rate was controlled to 30 kg/hr.

The pellets obtained by the method of manufacturing described above were dried at 80° C. for 12 hours, and then injection-molded using an injection molding machine (100T) from FANUC Corporation, at a cylinder temperature of 280° C., and a die temperature of 130° C., to obtain an ISO tensile test piece (4 mm thick).

Injection speed: Set to 50 mm/s by calculating the flow rate of resin, based on the cross-sectional area of the ISO tensile test piece at the center portion thereof. The VP switch-over was set to a point of approximately 95% filling, followed by dwelling. The dwelling was sustained at 500 kgf/cm², which is somewhat high but not causing flash, for 15 seconds. Cooling time was set to 15 seconds.

<Manufacture of Plate-Type Test Piece for Evaluating Appearance>

The obtained pellets were dried at 80° C. for 12 hours, and then injection-molded using 100iα from FANUC Corporation (clamping pressure=100 t), at a cylinder temperature of 300° C., and a die temperature of 140° C., in such a way to fluidize the composition at the film gate and to inject it from one side to produce an ISO test piece having dimensions of 100 mm×100 mm×2 mm (thickness). The process was carried out while setting the filling time to 0.5 seconds, the dwelling pressure to 600 kg/cm², the dwelling time to 10 seconds, and the cooling time to 15 seconds.

<Test Piece for Evaluation and Measurement of Moldability>

The individual components were dry-blended according to the ratio listed in Table below, and the obtained dry blend was then fed to the base portion of a twin-screw extruder ("TEM26SS" from Toshiba Machine Co., Ltd.) to manufacture pellets. The temperature of extruder was set to 280° C., and the discharge rate was set to 30 kg/hr.

The thus obtained pellets were dried at 80° C. for 12 hours, and then injection-molded using SE50D from Sumitomo Heavy Industries, Ltd. (clamping pressure=50 t), at a cylinder temperature of 290° C., and a die temperature of 125° C., to obtain an ISO tensile test piece having dimensions of 12.6 mm×126 mm×0.8 mm (thickness). The process was carried out while setting the filling time to 0.4 seconds, the dwelling pressure to 800 kg/cm², the dwelling time to 3 seconds, and the cooling time to 6 seconds.

<Flexural Modulus>

Flexural modulus at 23° C. was measured in accordance with ISO 178, using the ISO test piece obtained above.

<Notched Charpy Impact Strength>

Using the ISO test piece obtained above, the notched Charpy impact strength at 23° C. was measured in accordance with ISO 179.

<Evaluation of Plate Appearance (CF Floating)>

The plate-type test piece manufactured above was observed visually and under a microscope, and evaluated as follows:

A: Glossy appearance without carbon fiber exposed to the surface.

B: Fibers are seen to expose to the surface.

<Evaluation of Plate Appearance (CF Visibility)>

The plate-type test piece manufactured above was visually observed, and evaluated as follows. The test piece having the carbon fiber exposed to the surface was determined to be "determination not possible".

A: Uniform surface through which orientation of carbon fiber not observable.

B: Caron fibers seen through, and give non-uniform surface.

<Moldability (Mold Release Failure Due to Sticking)>

In the process of manufacturing the test piece for evaluation and measurement of moldability, how the test piece was released from the mold was observed, and evaluated as follows.

A: The molded article was releasable without problem, and remained solid even immediately after being released.

B: The molded article was releasable without problem, but remained somewhat soft immediately after being released (practical level).

C: The molded article deformed upon releasing, and remained soft immediately after being released.

TABLE 1

| | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| PAMXD6 | 100 | 80 | | | | | 80 | 100 | | 100 | 80 | 100 |
| PAMP6 | | 20 | 100 | 100 | 100 | 100 | 20 | | | | 20 | |
| PA66 | | | | | | | | | 100 | | | |
| CF (PAN-based) | 100 | 100 | 80 | 100 | | 40 | 100 | 100 | 100 | 130 | 100 | |
| CF (Pitch-based) | | | | | 100 | 60 | | | | | | |
| Glass fiber | | | | | | | | | | | | 100 |
| Carbon black | 1 | 1 | 1 | | 1 | 1 | 0.02 | | 1 | 1 | 5 | 1 |
| Black dye | | | | 0.5 | | | | | | | | |
| Mold releasing agent | 0.6 | 0.6 | 0.6 | 0.6 | 0.6 | 0.6 | 0.6 | 0.6 | 0.6 | 0.6 | 0.6 | 0.6 |
| Flexural modulus (GPa) | 42.4 | 43.1 | 33.4 | 42.3 | 31.9 | 39.0 | 42.1 | 42.1 | 34.5 | Compounding not possible | 43.5 | 18.4 |
| Notched Chrapy impact strength (kJ/m²) | 6.1 | 6.3 | 5.9 | 6.0 | 4.7 | 5.2 | 6.1 | 5.9 | 8.4 | Compounding not possible | 6.1 | 10 |
| Appearance of plate (CF floating) | A | A | A | A | A | A | A | A | B | Compounding not possible | B | — |

TABLE 1-continued

| | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Appearance of plate (CF visibility) | A | A | A | A | A | A | B | B | Determination not possible | Compounding not possible | Determination not possible | — |
| Moldability | B | A | A | B | A | A | B | C | A | Compounding not possible | A | A |

As is clear from the results above, when the compositions of this invention (Examples 1 to 6) were used, the obtainable molded articles were found to show high rigidity, large elastic modulus, and good appearance without notable floating of carbon fiber and visible carbon fiber seen through it. In particular, when the carbon black was used as the black colorant, a good moldability was also demonstrated for thin wall molded article.

In contrast, when the addition quantity of black colorant was less than 0.1 parts by weight per 100 parts by weight of the crystallizable thermoplastic resin (Comparative Example 1), the molded article was found to show a poor appearance with the carbon fiber seen through the surface.

When the black colorant was not blended (Comparative Example 2), the molded article was found to show a poor appearance, with the carbon fiber seen through the surface. Also the moldability of thin wall molded article was found to be poor.

When a crystallizable thermoplastic resin whose semicrystallization time (ST (P)) falls outside the range from 20 to 500 seconds was used as the thermoplastic resin (Comparative Example 3), the molded article was found to show a poor appearance, with the carbon fiber exposed to the surface. The visibility of the carbon fiber through the material was of an undeterminable level.

When the addition quantity of the carbon fiber exceeded 120 parts by weight, per 100 parts by weight of the crystallizable thermoplastic resin (Comparative Example 4), the resin clogged in the dies and could not be ejected from the extruder, so that the compound per se could not be prepared.

When the addition quantity of the black colorant exceeded 3 parts by weight per 100 parts by weight of the crystallizable thermoplastic resin (Comparative Example 5), the molded article was found to show a poor appearance, with the carbon fiber exposed to the surface. The visibility of the carbon fiber through the material was of an undeterminable level.

When a glass fiber was used in place of the carbon fiber (Comparative Example 6), the molded article was found to show a poor flexural modulus. The appearance was not evaluated since the carbon fiber was not used.

It was also found that more better elastic modulus and Charpy impact strength were achieved, by using the PAN-based carbon fiber as the carbon fiber.

The invention claimed is:

1. A thermoplastic resin composition comprising 80 to 120 parts by weight of a carbon fiber and 0.1 to 3.0 parts by weight of a black colorant, per 100 parts by weight of a (A) crystallizable thermoplastic resin which shows a semicrystallization time of 20 to 500 seconds, wherein the semicrystallization time is measured by depolarization photometry, under conditions that a sample melting temperature is 20 to 40° C. higher than a melting point of the crystallizable thermoplastic resin, a sample melting time is 3 minutes, and an oil bath temperature for crystallization is 140° C.,
wherein the carbon fiber comprises polyacrylonitrile-based carbon fiber,
wherein the (A) crystallizable thermoplastic resin is a xylylenediamine-based polyamide resin which comprises diamine constitutive units consisting essentially of 70 to 100% by mol of metaxylylenediamine and 30 to 0% by mol of paraxylylenediamine, and 70% by mol or more of a dicarboxylic acid constitutive unit being derived from adipic acid,
wherein the carbon fiber is about 43.7 to about 54.5% by weight of the thermoplastic resin composition,
wherein the total content of the crystallizable thermoplastic resin and the carbon fiber accounts for 90% by weight or more of the thermoplastic resin composition,
wherein the black colorant is carbon black,
wherein the carbon black has a DBP absorption of 30 to 300 cm$^3$/100 g,
wherein the carbon black comprises furnace black, and
wherein the thermoplastic resin composition is free from a flame retarder.

2. The thermoplastic resin composition of claim 1, wherein the polyamide resin contains an aromatic ring in a molecule thereof, and has a ratio of carbon atoms composing the aromatic ring, relative to the polyamide resin molecule, of 30% by mol or larger.

3. The thermoplastic resin composition of claim 1, wherein 30% by weight or more of the carbon fiber, contained in the thermoplastic resin composition, is assignable to the polyacrylonitrile-based carbon fiber.

4. The thermoplastic resin composition of claim 1, wherein a quantity of talc, contained in the thermoplastic resin composition, is 1% by weight or less relative to the thermoplastic resin composition.

5. The thermoplastic resin composition of claim 1, wherein the carbon fiber shows a tensile strength of 5.0 GPa or smaller, when measured at 23° C. in accordance with JIS R7601.

6. A molded article obtained by molding the thermoplastic resin composition described in of claim 1.

7. The thermoplastic resin composition of claim 2, wherein a quantity of talc, contained in the thermoplastic resin composition, is 1% by weight or less relative to the thermoplastic resin composition.

8. The thermoplastic resin composition of claim 1, the composition being free from dyes.

* * * * *